(12) United States Patent
Genc-Kaya et al.

(10) Patent No.: US 10,878,460 B2
(45) Date of Patent: Dec. 29, 2020

(54) METHOD AND APPARATUS FOR DETERMINING PROMOTION PRICING PARAMETERS

(71) Applicant: Groupon, Inc., Chicago, IL (US)

(72) Inventors: Latife Genc-Kaya, Chicago, IL (US);
Kamson Lai, Chicago, IL (US);
Francisco Jose Larrain Wicha, Palo Alto, CA (US); Gaston L'Huillier, Cambridge, MA (US)

(73) Assignee: Groupon, Inc., Chicago, IL (US)

( * ) Notice: Subject to any disclaimer, the term of this patent is extended or adjusted under 35 U.S.C. 154(b) by 55 days.

(21) Appl. No.: 16/217,087

(22) Filed: Dec. 12, 2018

(65) Prior Publication Data

US 2019/0279258 A1    Sep. 12, 2019

Related U.S. Application Data

(63) Continuation of application No. 13/913,887, filed on Jun. 10, 2013, now Pat. No. 10,192,243.

(51) Int. Cl.
*G06Q 30/02* (2012.01)
(52) U.S. Cl.
CPC ..... *G06Q 30/0273* (2013.01); *G06Q 30/0247* (2013.01)
(58) Field of Classification Search
None
See application file for complete search history.

(56) References Cited

U.S. PATENT DOCUMENTS 5,715,445 A    2/1998 Wolfe
5,870,770 A    2/1999 Wolfe
(Continued)

FOREIGN PATENT DOCUMENTS

KR    10-2008-0036829 A    4/2008
WO    00/79456 A2    12/2000
(Continued)

OTHER PUBLICATIONS

"Next Step for Groupon Scheduler," Groublogpon—The Sereous Blog of Froupon, Mar. 18, 2012. [Retrieved from the Internet Mar. 26, 2012: <http://www.groupon.com/blog/cities.next-step-groupon-scheduler/>.
(Continued)

*Primary Examiner* — Azam A Ansari
(74) *Attorney, Agent, or Firm* — Alston & Bird LLP

(57) ABSTRACT

A method, apparatus, and computer program product are disclosed to improve selection of promotion pricing parameters. The method may determine one or more promotion pricing parameters for a promotion that is offered by a promotion and marketing service. The method includes generating one or more predictive models based on historical promotion performance data and generating a revenue equation using the one or more predictive models. The revenue equation provides an estimate of a revenue received by the promotion and marketing service based on the one or more predictive models. The method further includes determining an estimated revenue using the revenue equation based on one or more input sets of promotion pricing parameters provided as input to the revenue equation, and selecting at least one of the input sets of promotion pricing parameters for the promotion based on the estimated revenue. A corresponding apparatus and computer program product are also provided.

9 Claims, 6 Drawing Sheets

(56) References Cited

U.S. PATENT DOCUMENTS

| | | |
|---|---|---|
| 5,946,682 A | 8/1999 | Wolfe |
| 5,948,040 A | 9/1999 | Delorme et al. |
| 5,970,470 A | 10/1999 | Walker et al. |
| 6,006,252 A | 12/1999 | Wolfe |
| 6,049,778 A | 4/2000 | Walker et al. |
| 6,101,484 A | 8/2000 | Halbert et al. |
| 6,128,599 A | 10/2000 | Walker et al. |
| 6,151,603 A | 11/2000 | Wolfe |
| 6,154,172 A | 11/2000 | Piccionelli et al. |
| 6,249,772 B1 | 6/2001 | Walker et al. |
| 6,263,351 B1 | 7/2001 | Wolfe |
| 6,269,343 B1 | 7/2001 | Pallakoff |
| 6,292,813 B1 | 9/2001 | Wolfe |
| 6,301,576 B1 | 10/2001 | Wolfe |
| 6,327,573 B1 | 12/2001 | Walker et al. |
| 6,336,131 B1 | 1/2002 | Wolfe |
| 6,341,305 B2 | 1/2002 | Wolfe |
| 6,384,850 B1 | 5/2002 | McNally et al. |
| 6,415,262 B1 | 7/2002 | Walker et al. |
| 6,463,265 B1 | 10/2002 | Cohen et al. |
| 6,477,581 B1 | 11/2002 | Carpenter et al. |
| 6,584,451 B1 | 6/2003 | Shoham et al. |
| 6,604,089 B1 | 8/2003 | Van et al. |
| 6,604,103 B1 | 8/2003 | Wolfe |
| 6,631,356 B1 | 10/2003 | Van et al. |
| 6,754,636 B1 | 6/2004 | Walker et al. |
| 6,778,837 B2 | 8/2004 | Bade et al. |
| 6,812,851 B1 | 11/2004 | Dukach et al. |
| 6,836,476 B1 | 12/2004 | Dunn et al. |
| 6,842,719 B1 | 1/2005 | Fitzpatrick et al. |
| 6,876,983 B1 | 4/2005 | Goddard et al. |
| 6,901,374 B1 | 5/2005 | Himes |
| 6,918,039 B1 | 7/2005 | Hind et al. |
| 6,928,416 B1 | 8/2005 | Bertash |
| 6,931,130 B1 | 8/2005 | Kraft et al. |
| 6,934,690 B1 | 8/2005 | Van et al. |
| 6,937,868 B2 | 8/2005 | Himmel et al. |
| 6,970,837 B1 | 11/2005 | Walker et al. |
| 6,970,922 B1 | 11/2005 | Spector |
| 6,985,879 B2 | 1/2006 | Walker et al. |
| 7,000,116 B2 | 2/2006 | Bates et al. |
| 7,007,013 B2 | 2/2006 | Davis et al. |
| 7,039,603 B2 | 5/2006 | Walker et al. |
| 7,043,526 B1 | 5/2006 | Wolfe |
| 7,072,848 B2 * | 7/2006 | Boyd ............... G06Q 30/02 705/14.1 |
| 7,080,029 B1 | 7/2006 | Fallside et al. |
| 7,103,365 B2 | 9/2006 | Myllymaki |
| 7,103,565 B1 | 9/2006 | Vaid |
| 7,103,594 B1 | 9/2006 | Wolfe |
| 7,107,228 B1 | 9/2006 | Walker et al. |
| 7,107,230 B1 | 9/2006 | Halbert et al. |
| 7,113,797 B2 | 9/2006 | Kelley et al. |
| 7,124,099 B2 | 10/2006 | Mesaros |
| 7,124,107 B1 | 10/2006 | Pishevar et al. |
| 7,124,186 B2 | 10/2006 | Piccionelli |
| 7,146,330 B1 | 12/2006 | Alon et al. |
| 7,181,419 B1 | 2/2007 | Mesaros |
| 7,194,427 B1 | 3/2007 | Van et al. |
| 7,236,944 B1 | 6/2007 | Schwartz et al. |
| 7,246,310 B1 | 7/2007 | Wolfe |
| 7,251,617 B1 | 7/2007 | Walker et al. |
| 7,257,604 B1 | 8/2007 | Wolfe |
| 7,263,498 B1 | 8/2007 | Van et al. |
| 7,274,941 B2 | 9/2007 | Cole et al. |
| 7,289,815 B2 | 10/2007 | Gfeller et al. |
| 7,302,638 B1 | 11/2007 | Wolfe |
| 7,318,041 B2 | 1/2008 | Walker et al. |
| 7,340,691 B2 | 3/2008 | Bassett et al. |
| 7,349,879 B2 | 3/2008 | Alsberg et al. |
| 7,363,246 B1 | 4/2008 | Van et al. |
| 7,376,580 B1 | 5/2008 | Walker et al. |
| 7,406,332 B1 | 7/2008 | Gaillard et al. |
| 7,409,429 B2 | 8/2008 | Kaufman et al. |
| 7,428,418 B2 | 9/2008 | Cole et al. |
| 7,430,521 B2 | 9/2008 | Walker et al. |
| 7,433,874 B1 | 10/2008 | Wolfe |
| 7,447,642 B2 | 11/2008 | Bodin |
| 7,467,137 B1 | 12/2008 | Wolfe |
| 7,469,138 B2 | 12/2008 | Dayar et al. |
| 7,472,109 B2 | 12/2008 | Katibah et al. |
| 7,480,627 B1 | 1/2009 | Van et al. |
| 7,529,542 B1 | 5/2009 | Chevion et al. |
| 7,536,385 B1 | 5/2009 | Wolfe |
| 7,539,742 B2 | 5/2009 | Spector |
| 7,577,581 B1 | 8/2009 | Schuyler |
| 7,589,628 B1 | 9/2009 | Brady, Jr. |
| 7,613,631 B2 | 11/2009 | Walker et al. |
| 7,627,498 B1 | 12/2009 | Walker et al. |
| 7,643,836 B2 | 1/2010 | McMahan et al. |
| 7,650,307 B2 | 1/2010 | Stuart |
| 7,668,832 B2 | 2/2010 | Yeh et al. |
| 7,672,897 B2 | 3/2010 | Chung et al. |
| 7,689,468 B2 | 3/2010 | Walker et al. |
| 7,689,469 B1 | 3/2010 | Mesaros |
| 7,693,736 B1 | 4/2010 | Chu et al. |
| 7,693,748 B1 | 4/2010 | Mesaros |
| 7,693,752 B2 | 4/2010 | Jaramillo |
| 7,702,560 B1 | 4/2010 | Wiesehuegel et al. |
| 7,711,604 B1 | 5/2010 | Walker et al. |
| 7,720,743 B1 | 5/2010 | Marks |
| 7,725,480 B2 | 5/2010 | Bassett et al. |
| 7,734,779 B1 | 6/2010 | Piccionelli |
| 7,760,112 B2 | 7/2010 | Bauchot et al. |
| 7,774,453 B2 | 8/2010 | Babu et al. |
| 7,783,279 B2 | 8/2010 | Ramanathan et al. |
| 7,788,281 B2 | 8/2010 | Cole et al. |
| 7,791,487 B2 | 9/2010 | Meyer |
| 7,792,297 B1 | 9/2010 | Piccionelli et al. |
| 7,797,170 B2 | 9/2010 | Bodin |
| 7,848,765 B2 | 12/2010 | Phillips et al. |
| 7,860,753 B2 | 12/2010 | Walker et al. |
| 7,870,229 B2 | 1/2011 | Spector |
| 7,890,364 B2 | 2/2011 | Piccionelli |
| 8,010,417 B2 | 8/2011 | Walker et al. |
| 8,103,519 B2 | 1/2012 | Kramer et al. |
| 8,108,249 B2 * | 1/2012 | Schroeder ............... G06Q 10/04 705/7.37 |
| 8,131,619 B1 | 3/2012 | Veselka |
| 8,150,735 B2 | 4/2012 | Walker et al. |
| 8,284,061 B1 | 10/2012 | Dione |
| 8,301,495 B2 | 10/2012 | Mason |
| 8,355,948 B2 | 1/2013 | Mason |
| 8,364,501 B2 | 1/2013 | Rana et al. |
| 8,407,252 B2 * | 3/2013 | Bennett ............... G06Q 30/0207 707/784 |
| 8,650,072 B2 | 2/2014 | Mason et al. |
| 10,235,696 B1 | 3/2019 | L'Huillier et al. |
| 2002/0023010 A1 | 2/2002 | Rittmaster et al. |
| 2002/0065713 A1 | 5/2002 | Awada et al. |
| 2002/0103746 A1 | 8/2002 | Moffett |
| 2002/0116260 A1 | 8/2002 | Szabo et al. |
| 2002/0123930 A1 | 9/2002 | Boyd et al. |
| 2002/0188511 A1 | 12/2002 | Johnson et al. |
| 2003/0004802 A1 | 1/2003 | Callegari |
| 2003/0018559 A1 | 1/2003 | Chung et al. |
| 2003/0055765 A1 | 3/2003 | Bernhardt |
| 2004/0039626 A1 | 2/2004 | Voorhees |
| 2004/0116074 A1 | 6/2004 | Fujii et al. |
| 2004/0117246 A1 | 6/2004 | Applebaum |
| 2004/0148228 A1 | 7/2004 | Kwei |
| 2004/0186789 A1 | 9/2004 | Nakashima |
| 2004/0193489 A1 | 9/2004 | Boyd et al. |
| 2004/0243478 A1 | 12/2004 | Walker et al. |
| 2005/0043996 A1 | 2/2005 | Silver |
| 2005/0075945 A1 | 4/2005 | Hodge et al. |
| 2005/0102156 A1 | 5/2005 | Linduff |
| 2005/0182680 A1 | 8/2005 | Jones et al. |
| 2005/0221841 A1 | 10/2005 | Piccionelli et al. |
| 2005/0245241 A1 | 11/2005 | Durand et al. |
| 2006/0069619 A1 | 3/2006 | Walker et al. |
| 2006/0085259 A1 | 4/2006 | Nicholas et al. |
| 2006/0089882 A1 | 4/2006 | Shimansky |
| 2006/0106678 A1 | 5/2006 | Walker et al. |

(56) References Cited

U.S. PATENT DOCUMENTS

| | | |
|---|---|---|
| 2006/0161599 A1 | 7/2006 | Rosen |
| 2006/0178932 A1 | 8/2006 | Lang |
| 2006/0195368 A1 | 8/2006 | Walker et al. |
| 2006/0218043 A1 | 9/2006 | Rosenzweig et al. |
| 2006/0224465 A1 | 10/2006 | Walker et al. |
| 2006/0224466 A1 | 10/2006 | Walker et al. |
| 2006/0224467 A1 | 10/2006 | Walker et al. |
| 2006/0235754 A1 | 10/2006 | Walker et al. |
| 2006/0242028 A1 | 10/2006 | Walker et al. |
| 2006/0242036 A1 | 10/2006 | Walker et al. |
| 2006/0265289 A1 | 11/2006 | Bellissimo |
| 2007/0061209 A1 | 3/2007 | Jackson |
| 2007/0061220 A1 | 3/2007 | Vaid |
| 2007/0150354 A1 | 6/2007 | Walker et al. |
| 2007/0150371 A1 | 6/2007 | Gangji |
| 2007/0156529 A1 | 7/2007 | Walker et al. |
| 2007/0198360 A1 | 8/2007 | Rogers et al. |
| 2007/0208625 A1 | 9/2007 | Walker et al. |
| 2007/0225077 A1 | 9/2007 | Piccionelli |
| 2007/0280269 A1 | 12/2007 | Rosenberg |
| 2007/0281692 A1 | 12/2007 | Bucher et al. |
| 2007/0288330 A1 | 12/2007 | Vaid |
| 2008/0004888 A1 | 1/2008 | Davis et al. |
| 2008/0015938 A1 | 1/2008 | Haddad et al. |
| 2008/0027810 A1 | 1/2008 | Lerner et al. |
| 2008/0040211 A1 | 2/2008 | Walker et al. |
| 2008/0052186 A1 | 2/2008 | Walker et al. |
| 2008/0052189 A1 | 2/2008 | Walker et al. |
| 2008/0065490 A1 | 3/2008 | Novick et al. |
| 2008/0065565 A1 | 3/2008 | Walker et al. |
| 2008/0071622 A1 | 3/2008 | Walker et al. |
| 2008/0097857 A1 | 4/2008 | Walker et al. |
| 2008/0133336 A1 | 6/2008 | Altman et al. |
| 2008/0154714 A1 | 6/2008 | Liu et al. |
| 2008/0162318 A1 | 7/2008 | Butler et al. |
| 2008/0167991 A1 | 7/2008 | Carlson et al. |
| 2008/0201232 A1 | 8/2008 | Walker et al. |
| 2008/0208663 A1 | 8/2008 | Walker et al. |
| 2008/0208744 A1 | 8/2008 | Arthur et al. |
| 2008/0242514 A1 | 10/2008 | Piccionelli et al. |
| 2009/0006182 A1 | 1/2009 | Gammon |
| 2009/0024450 A1 | 1/2009 | Chen et al. |
| 2009/0024484 A1 | 1/2009 | Walker et al. |
| 2009/0027286 A1 | 1/2009 | Ohishi et al. |
| 2009/0030776 A1 | 1/2009 | Walker et al. |
| 2009/0037286 A1 | 2/2009 | Foster |
| 2009/0070263 A1 | 3/2009 | Davis et al. |
| 2009/0094109 A1 | 4/2009 | Aaronson et al. |
| 2009/0125414 A1 | 5/2009 | Kleinrock et al. |
| 2009/0150218 A1 | 6/2009 | Brunner et al. |
| 2009/0167553 A1 | 7/2009 | Hong et al. |
| 2009/0192935 A1 | 7/2009 | Griffin et al. |
| 2009/0307067 A1 | 12/2009 | Obermeyer |
| 2009/0313109 A1 | 12/2009 | Bous et al. |
| 2010/0049601 A1 | 2/2010 | Walker et al. |
| 2010/0063870 A1 | 3/2010 | Anderson et al. |
| 2010/0070303 A1 | 3/2010 | Massoumi et al. |
| 2010/0076832 A1 | 3/2010 | Cha |
| 2010/0082481 A1 | 4/2010 | Lin et al. |
| 2010/0094701 A1 | 4/2010 | Ghosh et al. |
| 2010/0114132 A1 | 5/2010 | Piccionelli et al. |
| 2010/0146604 A1 | 6/2010 | Piccionelli |
| 2010/0185465 A1 | 7/2010 | Rana et al. |
| 2010/0205004 A1 | 8/2010 | Aldrich |
| 2010/0241513 A1 | 9/2010 | Prasad et al. |
| 2010/0287103 A1 | 11/2010 | Mason |
| 2011/0029362 A1 | 2/2011 | Roeding et al. |
| 2011/0029363 A1 | 2/2011 | Gillenson et al. |
| 2011/0035266 A1 | 2/2011 | Patterson |
| 2011/0040609 A1 | 2/2011 | Hawkins et al. |
| 2011/0054996 A1 | 3/2011 | Spector |
| 2011/0099082 A1 | 4/2011 | Walker et al. |
| 2011/0153400 A1 | 6/2011 | Averbuch |
| 2011/0173096 A1 | 7/2011 | Bui |
| 2011/0218911 A1 | 9/2011 | Spodak |
| 2011/0231321 A1 | 9/2011 | Milne |
| 2011/0238499 A1 | 9/2011 | Blackhurst et al. |
| 2011/0313840 A1 | 12/2011 | Mason et al. |
| 2011/0313867 A9 | 12/2011 | Silver Andrew |
| 2012/0016745 A1 | 1/2012 | Hendrickson |
| 2012/0030002 A1 | 2/2012 | Bous et al. |
| 2012/0030066 A1 | 2/2012 | Stringfellow et al. |
| 2012/0036042 A1 | 2/2012 | Graylin et al. |
| 2012/0054031 A9 | 3/2012 | Walker et al. |
| 2012/0088487 A1 | 4/2012 | Khan |
| 2012/0095852 A1 | 4/2012 | Bauer et al. |
| 2012/0101889 A1 | 4/2012 | Kurata et al. |
| 2012/0130796 A1 | 5/2012 | Busch |
| 2012/0150603 A1 | 6/2012 | Bennett et al. |
| 2012/0172062 A1 | 7/2012 | Altman et al. |
| 2012/0173350 A1 | 7/2012 | Robson |
| 2012/0209730 A1 | 8/2012 | Garrett |
| 2012/0254020 A1 | 10/2012 | Debow |
| 2012/0259711 A1 | 10/2012 | Jabbawy |
| 2012/0303434 A1 | 11/2012 | Postrel |
| 2013/0024364 A1 | 1/2013 | Shrivastava et al. |
| 2013/0085804 A1 | 4/2013 | Leff et al. |
| 2013/0124281 A1 | 5/2013 | Evans et al. |
| 2013/0254104 A1 | 9/2013 | Fernandez |
| 2013/0275242 A1 | 10/2013 | Ramaratnam et al. |
| 2013/0317894 A1 | 11/2013 | Zhu et al. |
| 2014/0046757 A1 | 2/2014 | Kahn et al. |
| 2014/0074580 A1 | 3/2014 | Khuchua-Edelman et al. |
| 2014/0095232 A1 | 4/2014 | Shiva et al. |
| 2014/0122200 A1 | 5/2014 | Granville |
| 2014/0207584 A1 | 7/2014 | Wicha et al. |
| 2015/0046271 A1 | 2/2015 | Scholl et al. |

FOREIGN PATENT DOCUMENTS

| | | |
|---|---|---|
| WO | 00/79495 A2 | 12/2000 |
| WO | 01/08024 A2 | 2/2001 |
| WO | 01/11483 A2 | 2/2001 |
| WO | 01/50301 A2 | 7/2001 |
| WO | 2009/094385 A2 | 7/2009 |
| WO | 2011/112752 A1 | 9/2011 |
| WO | 2014/052882 A2 | 4/2014 |
| WO | 2014/062229 A1 | 4/2014 |
| WO | 2014/062230 A1 | 4/2014 |

OTHER PUBLICATIONS

Alan S. Davis "Group Buying on the Internet", Seminar Presentation Slides, University of Minnesota, MIS Research Center, Mar. 10, 2006.

Bermant, Charles, "ActBig: Save BiG", Internetnews.com, Nov. 16, 1999, 3 pgs.

Editor, "Technology Drives ActBig 'Next Generation' GroupBuying Application", Market Wire, Feb. 29, 2005.

International Search Report and Written Opinion for Application No. PCT/US201.2/027616 dated Sep. 27, 2012.

Kauffman, Robert J. et al., "Bid Together, Buy Together: On the Efficacy of Group-Buying Business Models in Internet Based Selling", paper prepared for the 5th Annual University of Minnesota Electronic Commerce conference, Mar. 27-28, 2001, Carlson School of Management, University of Minnesota, MN, 44 pgs.

Krishnan S. Anand and Ravi Aron (OPIM Department, The Wharton School, University of Pennsylvania), "Group Buying on the Web: A Comparison of Price Discovery Mechanisms", Management Science, vol. 49, No. 11, pp. 1546-1562, Nov. 2003.

PCT international Preliminary Report on Patentability for Application PCT/US2013/033145 dated Apr. 21, 2015.

PCT international Preliminary Report on Patentability for Application PCT/US2013/033169 dated Apr. 21, 2015.

PCT international Preliminary Report on Patentability for Application PCT/US2013/062389 dated Mar. 31, 2015.

PCT international Search Report and Written Opinion of the International Searching Authority for Application PCT/US2013/033145 dated Jun. 21, 2013.

PCT international Search Report and Written Opinion of the International Searching Authority for Application PCT/US2013/062389 dated May 27, 2014.

(56) References Cited

OTHER PUBLICATIONS

Rueb, Emily S., "Group Buying, Better Together", The New York Times City Blog, Feb. 16, 2010, 3 pgs.

Staff, "ActBig.com muscles in on group buying power", RedHerring.com, Oct. 13, 1999.

U.S. Provisional Application filed Aug. 13, 2012, In re: Shariff et al. entitled Unified payment and Return On Investment System, U.S. Appl. No. 61/682,762.

U.S. Provisional Application filed Jun. 18, 2012, In re: Kim et al. entitled Facilitating Consumer Payments and Redemptions of Deal Offers, U.S. Appl. No. 61/661,291.

U.S. Provisional Application filed Mar. 30, 2012, In re: Kim entitled "Generating Deal Offers and Providing Analytics Data", U.S. Appl. No. 61/618,338.

U.S. Provisional Application filed May 17, 2013; In re: Kahn et al., entitled Unified Payment and Return on Investment System, U.S. Appl. No. 61/824,850.

U.S. Provisional Patent Application filed Feb. 27, 2013, U.S. Appl. No. 61/770,174.

\* cited by examiner

METHOD AND APPARATUS FOR DETERMINING PROMOTION PRICING PARAMETERS

This application is a continuation of U.S. application Ser. No. 13/913,887, titled "METHOD AND APPARATUS FOR DETERMINING PROMOTION PRICING PARAMETERS" filed Jun. 10, 2013, the content of which is incorporated herein by reference in its entirety.

TECHNOLOGICAL FIELD

Example embodiments of the present invention relate generally to determining a promotion price and, more particularly, to a method and apparatus for determining a promotion price that maximizes performance of the promotion for a promotion and marketing service, merchants, and consumers.

BACKGROUND

Applicant has discovered problems with current methods for determining structure parameters of promotions. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product are provided for determining promotion pricing parameters. Example embodiments may include a method for determining one or more promotion pricing parameters for a promotion that is offered by a promotion and marketing service. The method may include generating one or more predictive models based on historical promotion performance data, generating a revenue equation using the one or more predictive models, wherein the revenue equation provides an estimate of a revenue received by the promotion and marketing service based on the one or more predictive models, determining, using a processor, an estimated revenue using the revenue equation based on one or more input sets of promotion pricing parameters provided as input to the revenue equation, and selecting at least one of the input sets of promotion pricing parameters for the promotion based on the estimated revenue. The one or more predictive models may include at least one of a demand model or a margin model. The one or more predictive models may be derived using a regression analysis on the historical promotion performance data. The historical promotion performance data may include promotion parameters used for past promotions and performance characteristics of the past promotions. The performance characteristics may include at least one of a promotion redemption rate, a promotion size, or a promotion refund rate. The promotion parameters may include at least one of a promotion accepted value, a promotion promotional value, a promotion residual value, or a merchant category. The revenue equation may be generated using a demand model and a margin model, and the estimated revenue may be calculated by multiplying a promotion size derived from the demand model by a margin value derived from the margin model. The margin model may be employed to determine the margin value that results in at least a threshold merchant ROI for a merchant associated with the promotion. In some embodiments, the threshold merchant ROI is zero. The one or more input sets of deal pricing parameters may be selected to maximize the estimated revenue.

The method may also include generating a promotion using at least one of the one or more input sets of deal pricing parameters. The selected input set of promotion pricing parameters may include a margin value, and the method may further include determining a promotion cost based on the margin value, and presenting the promotion cost to a merchant for approval. The method may also include receiving approval of the promotion cost and, in response to receiving the approval, generating the promotion with the selected input set of promotion pricing parameters. In some embodiments, the method includes monitoring one or more performance characteristics of the promotion, adding the one or more performance characteristics of the promotion to the historical promotion performance data, and updating at least one of the one or more predictive models based on the one or more performance characteristics of the promotion. Embodiments of the method may also include providing the selected at least one of the input sets of promotion pricing parameters to a merchant via a merchant interface, receiving an indication of a merchant selection of one or more of the selected at least one of the input sets, and generating the promotion using the selected at least one of the input sets of promotion pricing parameters in response to receiving the indication.

Embodiments may also include an apparatus for determining one or more promotion pricing parameters for a promotion that is offered by a promotion and marketing service. The apparatus may include a processor and a memory. The memory may store computer program code that, when executed by the processor, causes the apparatus to generate one or more predictive models based on historical promotion performance data, generate a revenue equation using the one or more predictive models, wherein the revenue equation provides an estimate of a revenue received by the promotion and marketing service based on the one or more predictive models, determine an estimated revenue using the revenue equation based on one or more input sets of promotion pricing parameters provided as input to the revenue equation, and select at least one of the input sets of promotion pricing parameters for the promotion based on the estimated revenue. The one or more predictive models may include at least one of a demand model or a margin model. The one or more predictive models may be derived using a regression analysis on the historical promotion performance data. The historical promotion performance data may include promotion parameters used for past promotions and performance characteristics of the past promotions. The performance characteristics may include at least one of a promotion redemption rate, a promotion size, or a promotion refund rate. The promotion parameters may include at least one of a promotion accepted value, a promotion promotional value, a promotion residual value, or a merchant category. The revenue equation may be generated using a demand model and a margin model, and the estimated revenue may be calculated by multiplying a promotion size derived from the demand model by a margin value derived from the margin model. The margin model may be employed to determine the margin value that results in at least a threshold merchant ROI for a merchant associated with the promotion. The threshold merchant ROI may be zero. The one or more input sets of deal pricing parameters may be selected to maximize the estimated revenue. The apparatus may be further configured to generate a promotion using at least one of the one or more input sets of deal pricing parameters. The selected input set of promotion pricing parameters may include a margin value, and the apparatus may be further configured to determine a promotion cost based on the margin value, present the promotion cost to a merchant for approval. The apparatus may be further configured to receive approval of the promotion cost and, in response to receiving the approval, generate the promotion with the selected input set of promotion pricing parameters. The apparatus may be further configured to monitor one or more performance characteristics of the promotion, add the one or more performance characteristics of the promotion to the historical promotion performance data, and update at least one of the one or more predictive models based on the one or more performance characteristics of the promotion. The apparatus may be further configured to provide the selected at least one of the input sets of promotion pricing parameters to a merchant via a merchant interface, receive an indication of a merchant selection of one or more of the selected at least one of the input sets, and generate the promotion using the selected at least one of the input sets of promotion pricing parameters in response to receiving the indication.

Yet further embodiments may provide a computer program product for determining one or more promotion pricing parameters for a promotion that is offered by a promotion and marketing service. The computer program product may include a computer-readable storage medium storing computer program code that, when executed by an apparatus, causes the apparatus to generate one or more predictive models based on historical promotion performance data, generate a revenue equation using the one or more predictive models, wherein the revenue equation provides an estimate of a revenue received by the promotion and marketing service based on the one or more predictive models, determine an estimated revenue using the revenue equation based on one or more input sets of promotion pricing parameters provided as input to the revenue equation, and select at least one of the input sets of promotion pricing parameters for the promotion based on the estimated revenue. The one or more predictive models may include at least one of a demand model or a margin model. The one or more predictive models may be derived using a regression analysis on the historical promotion performance data. The historical promotion performance data may include promotion parameters used for past promotions and performance characteristics of the past promotions. The performance characteristics may include at least one of a promotion redemption rate, a promotion size, or a promotion refund rate. The promotion parameters may include at least one of a promotion accepted value, a promotion promotional value, a promotion residual value, or a merchant category. The revenue equation may be generated using a demand model and a margin model, and the estimated revenue may be calculated by multiplying a promotion size derived from the demand model by a margin value derived from the margin model. The margin model may be employed to determine the margin value that results in at least a threshold merchant ROI for a merchant associated with the promotion. The threshold merchant ROI may be zero. The one or more input sets of deal pricing parameters may be selected to maximize the estimated revenue. The instructions may further configure the apparatus to generate a promotion using at least one of the one or more input sets of deal pricing parameters. The selected input set of promotion pricing parameters may include a margin value, and the apparatus may be further configured to determine a promotion cost based on the margin value, and present the promotion cost to a merchant for approval. The computer program code may cause the apparatus to receive approval of the promotion cost and, in response to receiving the approval, generate the promotion with the selected input set of promotion pricing parameters. In some embodiments, the computer program code further causes the apparatus to monitor one or more performance characteristics of the promotion, add the one or more performance characteristics of the promotion to the historical promotion performance data, and update at least one of the one or more predictive models based on the one or more performance characteristics of the promotion. The computer program code may further cause the apparatus to provide the selected at least one of the input sets of promotion pricing parameters to a merchant via a merchant interface, receive an indication of a merchant selection of one or more of the selected at least one of the input sets, and generate the promotion using the selected at least one of the input sets of promotion pricing parameters in response to receiving the indication.

Embodiments may also include yet another method for determining one or more promotion pricing parameters for a promotion that is offered by a promotion and marketing service. The method may include generate, using a processor, one or more predictive models based on historical promotion performance data, generating a revenue equation using the one or more predictive models, wherein the revenue equation provides an estimate of a revenue received by the promotion and marketing service based on the one or more predictive models, determining an estimated revenue using the revenue equation based on one or more input sets of promotion pricing parameters provided as input to the revenue equation, determining, using at least one of the one or more predictive models, at least one of the one or more input sets of promotion pricing parameters that provide at least a minimum merchant return on investment, and selecting the determined at least one of the input sets of promotion pricing parameters for the promotion based on the estimated revenue. The minimum merchant return on investment may be zero.

Embodiments may include yet another apparatus for determining one or more promotion pricing parameters for a promotion that is offered by a promotion and marketing service. The apparatus may include a processor and a memory, the memory storing computer program code that, when executed by the processor, causes the apparatus to generate one or more predictive models based on historical promotion performance data, generate a revenue equation using the one or more predictive models, wherein the revenue equation provides an estimate of a revenue received by the promotion and marketing service based on the one or more predictive models, determine an estimated revenue using the revenue equation based on one or more input sets of promotion pricing parameters provided as input to the revenue equation, determine, using at least one of the one or more predictive models, at least one of the one or more input sets of promotion pricing parameters that provide at least a minimum merchant return on investment, and select the determined at least one of the input sets of promotion pricing parameters for the promotion based on the estimated revenue. The minimum merchant return on investment may be zero.

Embodiments may include yet another computer program product for determining one or more promotion pricing parameters for a promotion that is offered by a promotion and marketing service. The computer program product may include a computer-readable storage medium storing computer program code that, when executed by an apparatus, causes the apparatus to generate one or more predictive models based on historical promotion performance data, generate a revenue equation using the one or more predictive models, wherein the revenue equation provides an estimate of a revenue received by the promotion and marketing service based on the one or more predictive models, determine an estimated revenue using the revenue equation based on one or more input sets of promotion pricing parameters provided as input to the revenue equation, determine, using at least one of the one or more predictive models, at least one of the one or more input sets of promotion pricing parameters that provide at least a minimum merchant return on investment, and select the determined at least one of the input sets of promotion pricing parameters for the promotion based on the estimated revenue. The minimum merchant return on investment may be zero.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
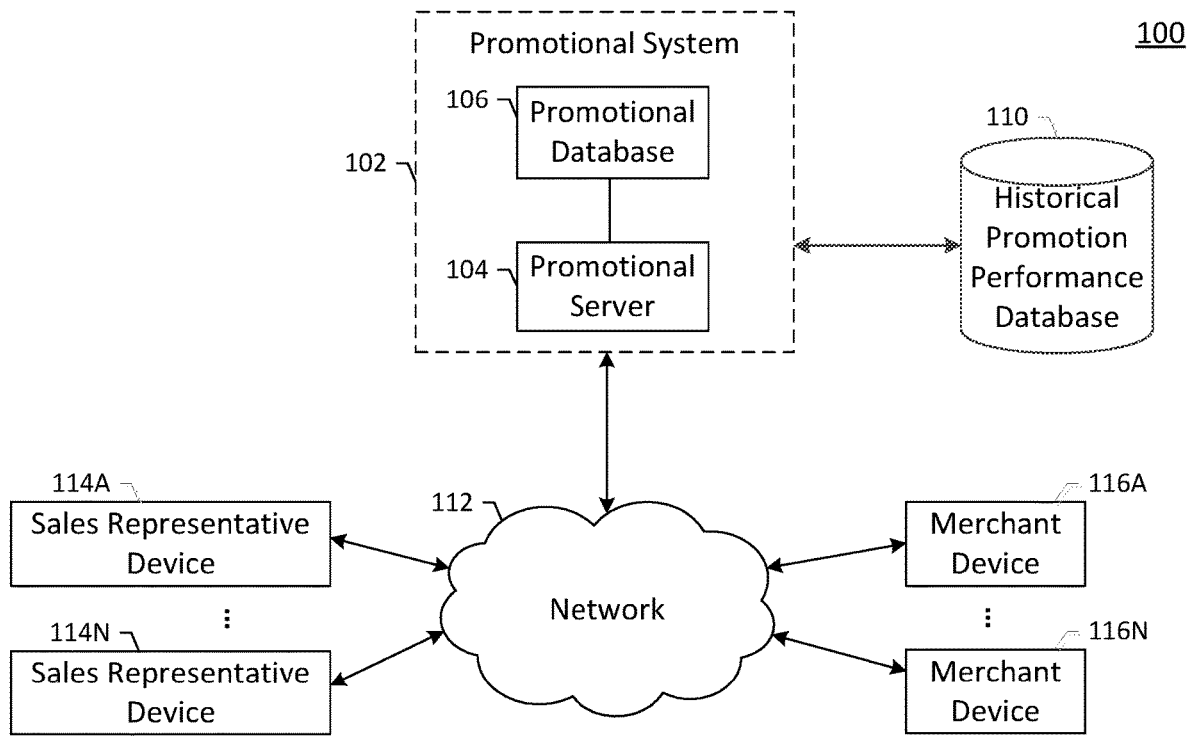
Figure 2:
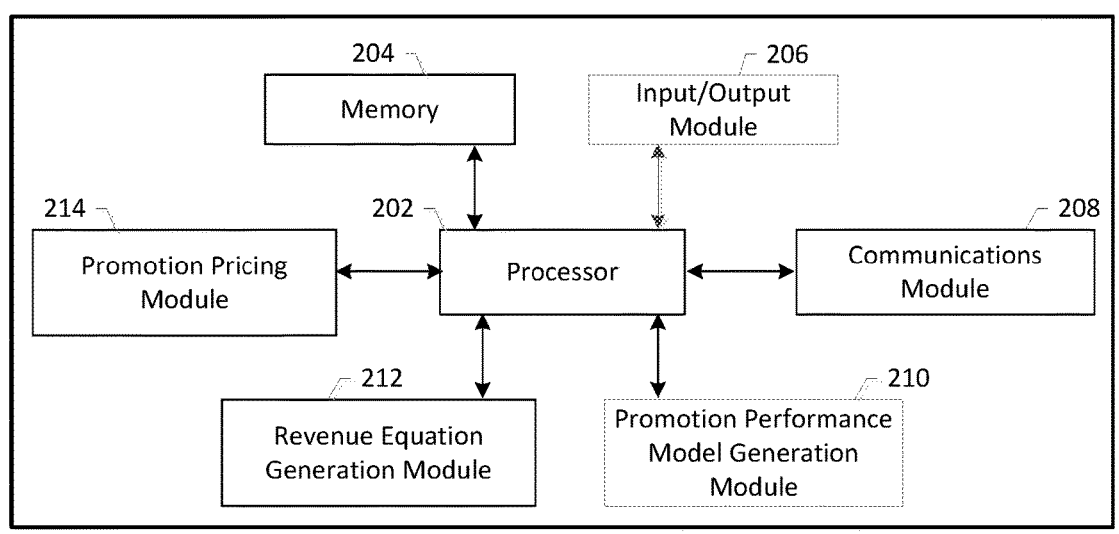
Figure 3:
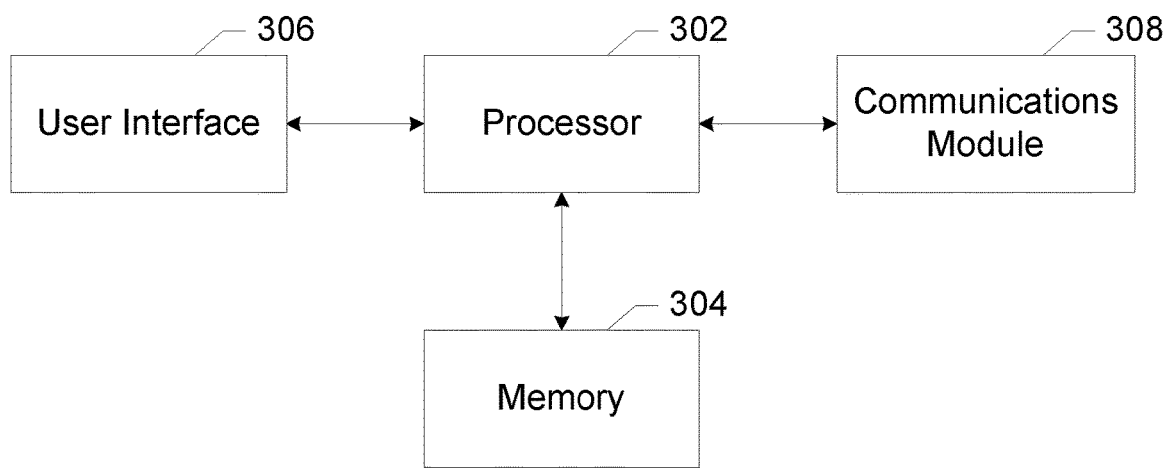
Figure 4:
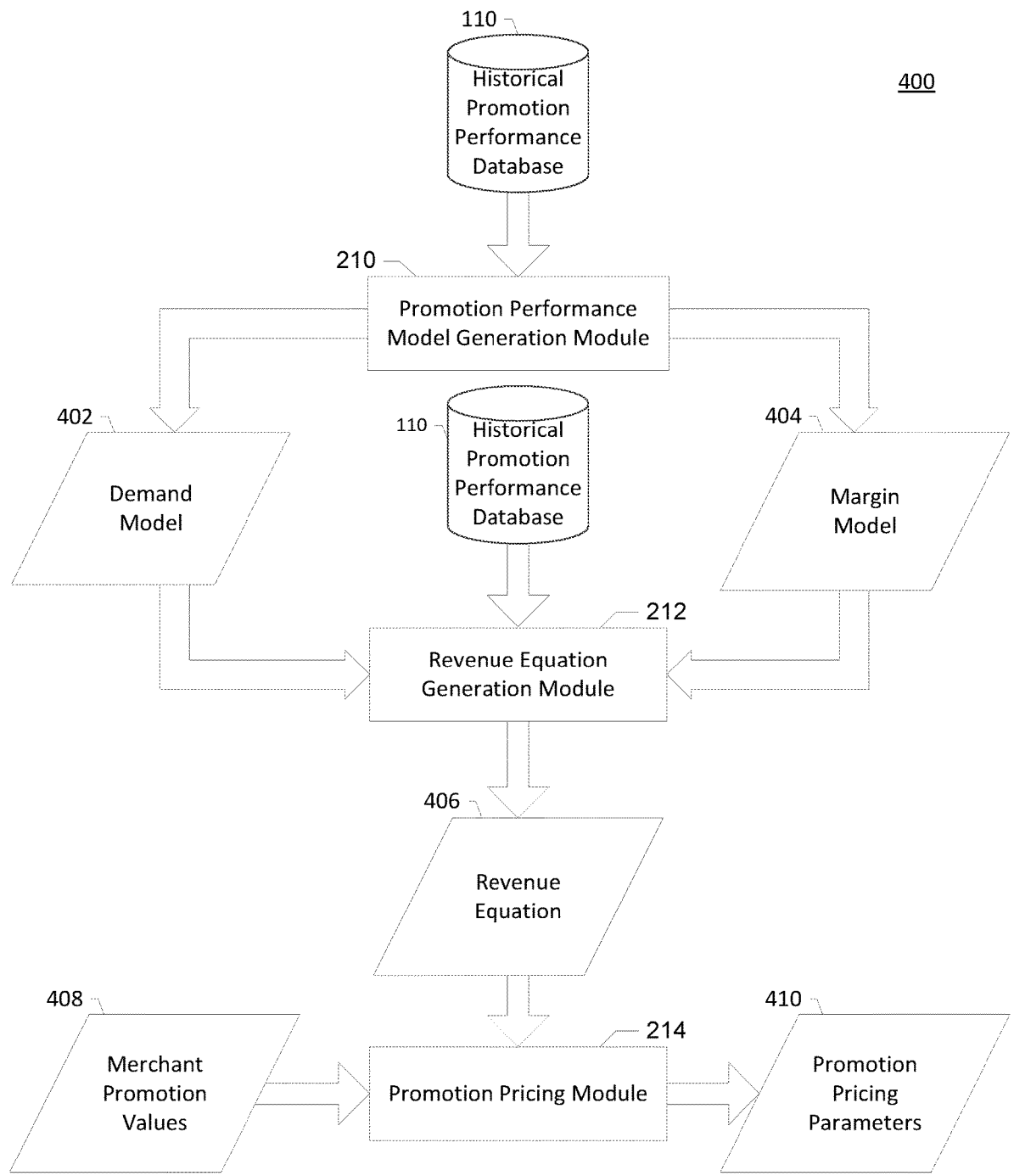
Figure 5:
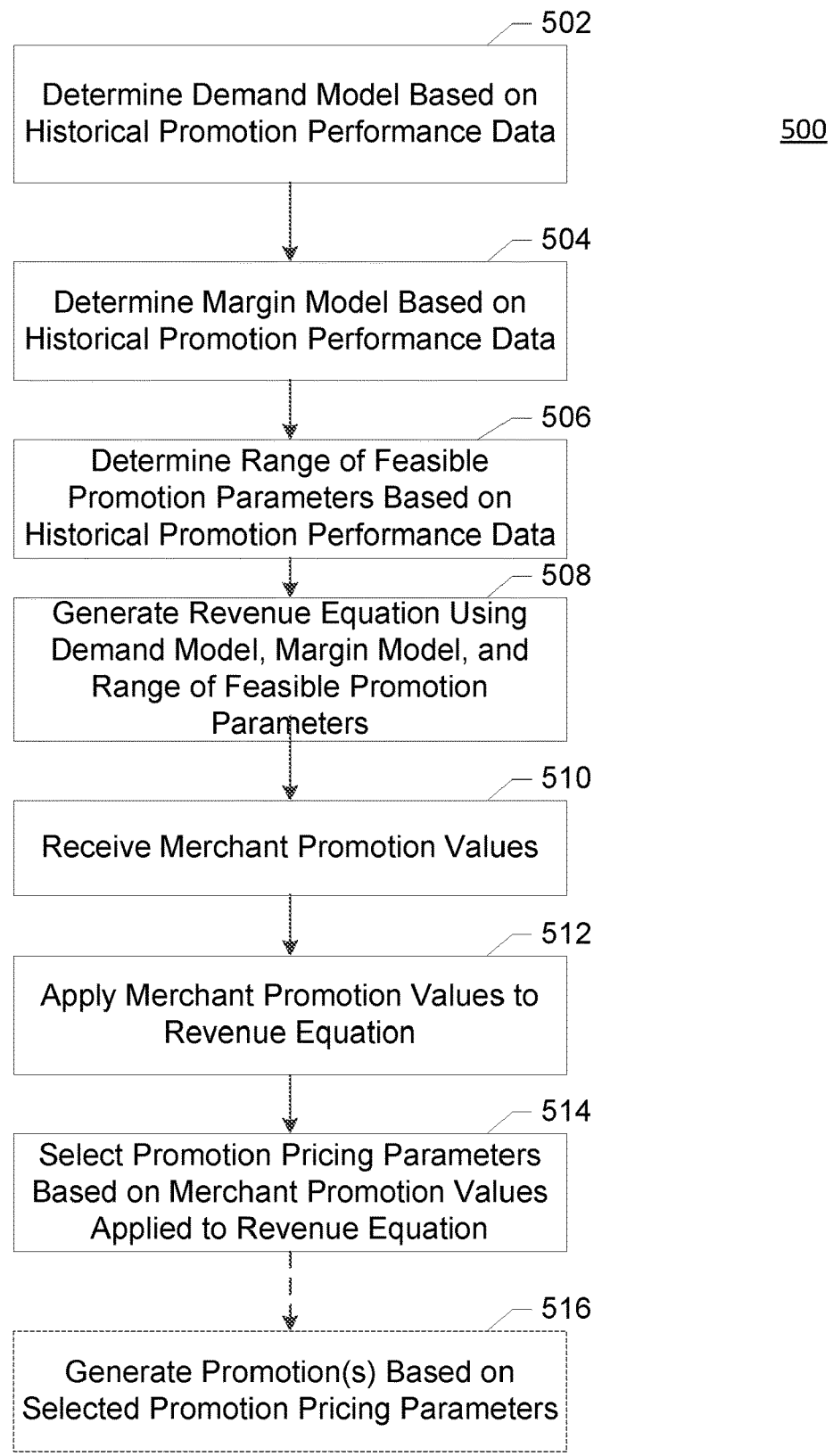
Figure 6:
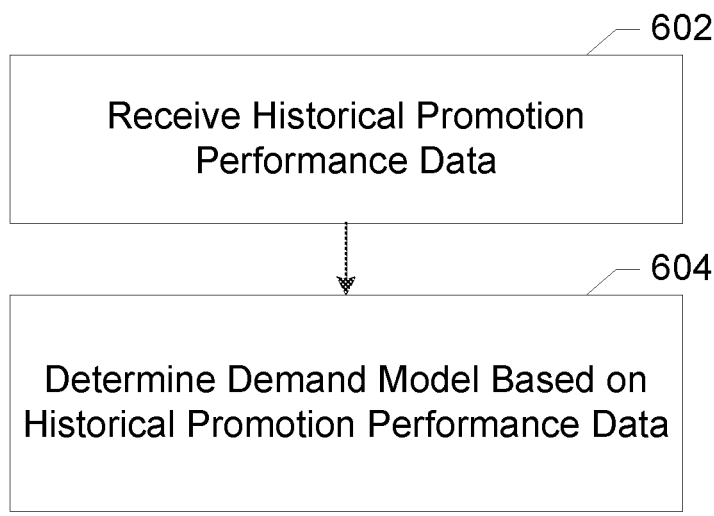
Figure 7:
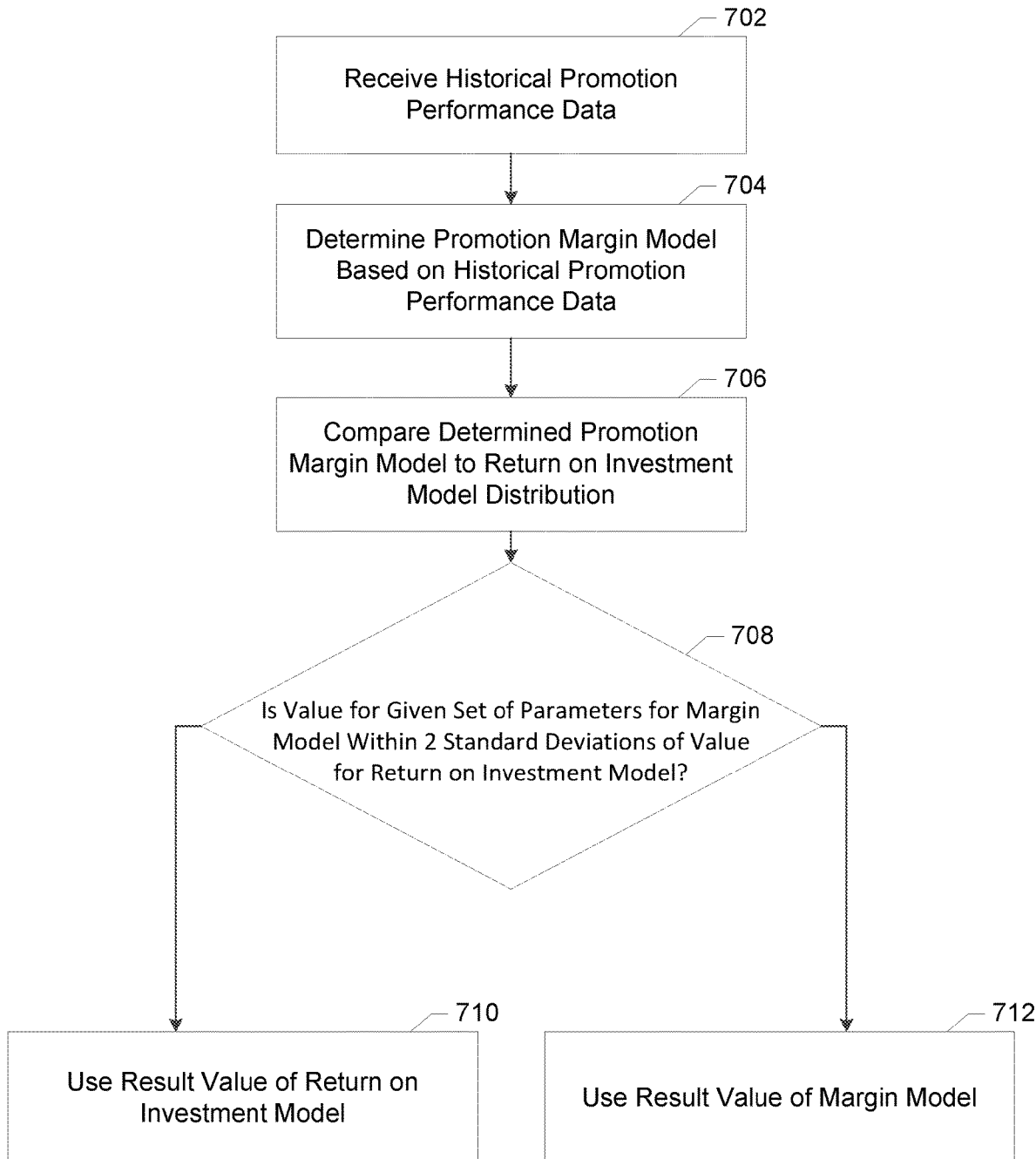

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for use in a promotional server, in accordance with some example embodiments of the present invention;

FIG. 3 illustrates a block diagram showing an example device for use by a sales representative or merchant, in accordance with an example embodiment of the present invention;

FIG. 4 illustrates a block diagram of an example data flow for determining promotion pricing parameters, in accordance with some example embodiments;

FIG. 5 illustrates a flowchart describing example operations for determining promotion pricing parameters from the perspective of a promotion and marketing service, in accordance with some example embodiments;

FIG. 6 illustrates a flowchart describing example operations for determining a demand model for a promotion from the perspective of a promotion and marketing service, in accordance with some example embodiments; and FIG. 7 illustrates a flowchart describing example operations for determining a promotion margin model for a promotion from the perspective of a promotion and marketing service, in accordance with some example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "promotion pricing parameters" may include values, parameters, bounds, considerations and/or the like that determine the accepted value of the promotion, the promotional value of the promotion, the residual value of the promotion, the size of the promotion offering (e.g., the number of the promotions sold) and/or the promotion margin (e.g., the portion of the accepted value received by the promotion and marketing service). The term "promotion pricing parameters" should thus be understood to relate to configurable aspects of the promotion that affect the amount of revenue derived from the promotion by the merchant and/or the promotion and marketing service.

As used herein, the term "return on investment" (ROI) refers to the overall benefit provided to the merchant as a result of offering one or more promotions via the promotion and marketing service. As described above, when a promotion is redeemed by a consumer for goods and/or services offered by the merchant, the merchant may receive a certain reimbursement value from the promotion and marketing service to account for at least a portion of the price of the goods and services provided to the consumer. In many cases, this reimbursement value may be in excess of the value of the goods and services provided to the consumer, resulting in a net benefit based solely upon the reimbursement value. In some other cases, the value of the goods and services provided to the consumer may exceed the reimbursement value. However, the ROI calculation does not only involve the reimbursement value of the promotion. For example, promotions may be targeted to consumers who are not already regular patrons, and these new consumers may be more inclined to patronize the merchant in the future if they have a good experience when using the promotion. Consumers may also spend in excess of the promotional value of the promotion, resulting in extra revenue for the merchant. Example embodiments of a system and method for determining and providing merchant ROI information are described further with respect to U.S. Provisional Patent Application 61/824,850 filed May 17, 2013 and U.S. patent application Ser. No. 13/841,347 filed Mar. 15, 2013, which are herein incorporated by reference in their entirety.

Overview

A method, apparatus, and computer program product are provided in accordance with an example embodiment of the present invention in order to improve determination of promotion pricing parameters. One of the mechanisms by which a promotion and marketing service may derive revenue is by taking a portion of the payment paid by consumers for each promotion sold to and/or redeemed by consumers via the promotion and marketing service. This "margin" ensures that the promotion and marketing service is compensated for the service provided to merchants and consumers in a way that encourages the promotion and marketing service to provide an effective product (e.g., the more promotions the promotion and marketing service provides, the more revenue they receive). However, it may make economic sense for the promotion and marketing service to be flexible with the margin they establish for certain promotions. For example, the promotion and marketing service may be motivated to lower the margin on promotions that are likely to sell a large number of units, or for promotions with a high accepted value (e.g., the percentage per promotion may be lower, but the absolute revenue per promotion sold may be higher).

Furthermore, other promotion pricing parameters may impact the overall margin. For example, the ratio between the promotional value and the accepted value of the promotion and the merchant cost of the goods or services being provided in exchange for the promotion may alter the margin of the promotion, as merchants may be reluctant to agree to offer promotions that will lose them money, while consumers may be less likely to purchase promotions that do not offer a significant discount. Assuming a constant price for the promotion, as the margin taken by the promotion and marketing service increases, the revenue remitted to the merchant decreases, the value in goods or services provided to the consumer decreases, the cost to the consumer increases, or some combination of the above. As such, selection of promotion pricing parameters requires a careful balance to maintain profitability for both the promotion and marketing service and the merchant, while also providing a sufficient discount to make the promotions desirable to consumers. There are several drawbacks to attempting to manually balance these factors.

For instance, attempting to manually select promotion parameters that "seem" beneficial to all parties may inadvertently offer too many promotions at too great a discount value, resulting in a negative return on investment for the merchant. For example, if too many promotions are offered at too large a discount value, the merchant may lose more value in products or services than they gain in marketing, repeat business, or purchases in excess of spending beyond the promotion value. If the promotion and marketing service charges too large a margin, the merchant may end up with a negative return on investment due to the fees charged by the promotion and marketing service. Similarly, promotions with too small a difference between a promotional value and an accepted value may not be attractive to consumers, as consumers may be unwilling to bother with purchasing a promotion that does not offer much benefit. As such, efforts to select promotion pricing parameters are fraught with monetary risk for both merchants and the promotion and marketing service.

As a result of these problems and others that may arise from time to time, merchants may be reluctant to engage with the promotion and marketing system due to the risk of not receiving an adequate return on their investment. These problems result in potential lost revenue for both merchants and the promotion and marketing service.

Accordingly, to overcome these problems, example embodiments of the present invention are shown for determining promotion pricing parameters in a manner that is more robust, efficient, and data-driven to improve revenue and marketing operations for both merchants and the promotion and marketing service. In some example embodiments, historical promotion performance data is used to derive promotion performance models that model the impact of various promotion parameters on promotion demand, promotion margins, promotional values, total revenue, and the like. These promotion performance models may be employed along with a set of characteristics of a particular merchant or type of merchant to generate a set of promotion pricing parameters that may result in improved performance for both the merchant (e.g., improved merchant return on investment) and the promotion and marketing service (e.g., improved margins for the promotion and marketing service while still providing positive return on investment to the merchant).

Example embodiments of the present invention enhance the selection of promotion pricing parameters by utilizing predictive models to ensure a positive ROI for the merchant while also establishing a favourable margin for the promotion and marketing service. In addition, example embodiments of the present invention may be capable of continued analysis of promotion performance data for promotions with pricing parameters established by embodiments of the invention, resulting in a positive feedback loop by which predictive models are continually refined and improved to provide even more accurate predictions of optimal pricing parameters.

System Architecture

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Sales representatives and merchants may access a promotional system 102 via a network 112 (e.g., the Internet, or the like) using computer devices 114A through 114N and 116A through 116N, respectively (e.g., one or more sales representative devices 114A-114N or one or more merchant devices 116A-116N). Moreover, the promotional system 102 may comprise a promotional server 104 in communication with a promotional database 106. The promotional system may further have access to a historical promotion performance database 110 storing historical information regarding previously offered promotions. The promotional system 102 is, in some examples, able to generate one or more predictive models to assist with selection of promotion pricing parameters, to determine promotion pricing parameters, and/or generate promotions with the determined pricing parameters, as will be described below.

The promotional server 104 may be embodied by a computing system, such as apparatus 200 shown in FIG. 2. As illustrated in FIG. 2, the apparatus 200 may include a processor 202, a memory 204, an input/output module 206, a communications module 208, a promotion performance model generation module 210, a revenue equation generation module 212, and/or a promotion pricing module 214. The apparatus 200 may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display and may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The promotion performance model generation module 210 may analyze historical promotion performance data, such as stored in the historical promotion performance database 110, and derive predictive models based on the historical promotion performance data, as described in greater detail below. For example, the promotion performance model generation module 210 may generate models for expected demand or margin for promotions based on the performance of promotions in the past. The promotion performance model generation module 210 may perform a regression analysis to determine the impact of certain promotion parameters, including but not limited to promotion pricing parameters, on these models. In some embodiments, these models are the result of machine learning algorithms that use historical promotion performance data as a training set. Aspects of the historical promotion performance data employed to generate the promotion performance models may include, but are not limited to, a type of promotion (e.g., pay an accepted value in exchange for a promotional value worth or products or services, a percentage discount off a total value, a certain number of goods or services, or the like), a merchant category (e.g., restaurant, spa, concert venue), a discount level (e.g., the difference between the accepted value and the promotional value), an accepted value of the promotion, a date range associated with the promotion, a number of impressions received for the promotion, whether the promotion was featured in a marketing material, particular "fine print" provisions of the promotion, the number of promotions offered, the redemption rate of the promotion, the refund rate of the promotion, or the like.

The revenue equation generation module 212 may process one or more data models generated from the historical promotion data (e.g., one or more models generated by the promotion performance model generation module 210) to generate a revenue equation. The revenue equation may be generated for a particular merchant, type of merchant, promotion category, or the like, and the revenue equation may include a weighted set of variables for determining an expected revenue based on certain input values.

The promotion pricing module 214 may utilize a revenue equation (e.g., a revenue equation generated by the revenue equation generation module 212) to determine a set of promotion pricing parameters based on certain input values, such as input values received from a merchant. The promotion pricing module 214 may use the input values as an initial set of values to determine a set of pricing parameters that ensure a positive ROI for the merchant while also ensuring that the promotion and marketing service maintains at least a minimum margin and ensuring that the promotion contains terms that are attractive to consumers.

In one embodiment, a sales representative or merchant may use the apparatus 200 to generate promotion pricing parameters in accordance with example embodiments of the invention. However, other embodiments of the present invention may run outside of the promotional system 102, such as, for example, on an end-user device, such as sales representative device 114 or merchant device 116.

Referring now to FIG. 3, a block diagram is illustrated showing an example apparatus 300 that may be configured to enable a user to select promotion pricing parameters from outside the promotional system 102, in accordance with embodiments of the present invention.

In FIG. 3, the apparatus 300, which may embody sales representative device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface may include a display and may comprise a web user interface, a mobile application, a client device, a kiosk, or the like. In some embodiments, the user interface 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Example Data Flow

To enable a user (such as a sales representative, a merchant, or any other entity interacting with the promotion system) to select and/or configure pricing parameters for one or more promotions. As described above, the promotion pricing parameters may be generated through the use of one or more predictive models derived from historical promotion performance data.

FIG. 4 illustrates an example data flow representing the process by which promotion pricing parameters may be determined. In this regard, the historical promotion performance data may be stored in a historical promotion performance database 110 as described above with respect to FIG. 1. The use of the historical promotion performance data may be used based on an assumption that customer reaction to future promotions with particular characteristics will be similar to the response to past promotions with the same characteristics.

In order to maximize revenue derived from a particular promotion, embodiments may seek to maximize the unit price of the promotion and the number of promotions sold. However, the unit price and number sold may depend upon other promotion factors, including but not limited to the promotion accepted price, the discount offered by the promotion, the category of the merchant offering the promotion, the type of good or service associated with the promotion, whether the promotion is given a prominent marketing position (e.g., a "featured" promotion or a "promotion of the day"), the day of the week the promotion was offered, the number of days for which the promotion was offered, whether the promotion was advertised in a particular media type, or the like. In order to attempt to account for these factors to select appropriate pricing parameters for the promotion, embodiments may employ one or more predictive models as described herein.

In some embodiments, a calculation of an overall revenue derived from a promotion may take the form:

$$\max_{p,d,b} Rev = p*q*(1-b) \quad (1)$$

Such that:

$$ROI(p,d,b) \geq 0 \quad (2)$$

and:

$$t \geq q \geq cap \quad (3)$$

Where, Rev is the revenue derived from the promotion, p is the unit price of the promotion, q is the promotion size, (e.g., the expected number of promotions to be sold for a given set of promotion pricing parameters), b is merchant's margin (the reimbursement value/unit price of the promotion), d is the discount (the benefit to the consumer of using the promotion) of the promotion, cap is the capacity of the promotion (e.g., the number of promotions offered for sale), and t is the tipping point (e.g., minimum number of promotions to begin selling the promotion).

In the present example, the historical promotion performance data may be processed by a promotion performance model generation module 210, such as described above with respect to FIG. 2, to facilitate generation of a demand model 402 and a margin model 404. However, it should be readily apparent that additional or alternative predictive models may be employed for additional or alternative factors in order to account for the effect of other parameters on overall revenue derived from the promotion. In some embodiments, the promotion performance model generation module 210 may perform a regression analysis on any of these factors or other factors and determine correlations between particular promotion parameters and promotion performance characteristics such as the number of promotions sold or overall promotion popularity (e.g., the percentage of total promotions sold). The promotion performance model generation module 210 may select particular parameters that have high correlations (e.g., an "$R^2$" value as commonly known in statistical analysis techniques that exceeds a particular threshold) with promotion performance characteristics, and predictive models may be generated based on these correlations for use in generating a revenue equation.

The demand model 402 may be generated by employing regression techniques to determine the impact of various promotion parameters on the size of past promotion offerings. For example, the size of the promotion offering (e.g., the number of promotions purchased and/or redeemed) is one component for determining revenue, as the revenue may be a result of the margin for each promotion multiplied by the size of the promotion. In some embodiments, the historical promotion performance data includes details of the sizes of past promotions along with the parameters used for those promotions. As such, regression analysis techniques may be employed to ascertain the correlations between particular parameters and promotion size. In some embodiments, an example regression analysis may take the following form:

$$\log q = \alpha_1 \log p + \alpha_2 \log d + \alpha_3 c + \alpha_4 sc + \alpha_5 ds + \alpha_6 di + \alpha_7 r + \alpha_e \quad (4)$$

Where, the $\alpha$ values are constants weights to be derived via the regression analysis, p is the unit price, d is the discount, c is the merchant category (e.g., a merchant type such as restaurant, spa, salon, gym, or the like), sc is the merchant subcategory (e.g., a more particular merchant category, such as "fast food" or "pizza" for a "restaurant" category), ds is the promotion service category (e.g., "Italian cuisine", "American traditional cuisine", or "massage"), di is the division (e.g., a location or region in which the promotion is offered), and r is a merchant quality score (e.g., a rating assigned to the merchant relative to other merchants, such as provided by a review site, a weighted average of reviews, or internal research).

Since, for a given merchant, the category, subcategory, division, promotion service category, and research ranking may be known and fixed, certain parts of an equation to predict promotion size may be constant. After accounting for these fixed factors, an example equation to predict the size of a particular promotion may be:

$$\log q = \alpha_1 \log p + \alpha_2 \log d + \alpha_0 \quad (5)$$

Where $\alpha_0$ is a constant representing the fixed values for the particular promotion (e.g., merchant, category, subcategory, etc.). For this particular example, the results indicate that the prime factors influencing the promotion size for the example regression analysis are the promotion unit price (p) and the discount offered by the promotion (d).

In addition to determining a model for promotion size, the promotion performance model generation module 210 may also generate a margin model 404 based on the historical promotion performance data. The margin model 404 may reflect the impact of values such as unit price of the promotion, the discount offered by the promotion, the category of the merchant, and the cost of the goods/services associated with the promotion on the merchant ROI to ensure that the merchant achieves a minimum threshold ROI. For example, the margin model 404 may be generated by examining the merchant ROI for past promotions with various parameters, and calculating the maximum margin available to the promotion and marketing service to ensure a minimum merchant ROI (e.g., an ROI of at least 0, 5%, 10%, 20%, or the like). In this manner, the margin model 404 may be used to predict a margin for the promotion and marketing service that ensures the merchant obtains a positive ROI while also ensuring that the promotion and marketing service obtains a fair amount of revenue for the services provided to the merchant. As an example, the margin model may be derived based on a regression analysis of the following equation:

$$b^* = \beta_1 p + \beta_2 d + \beta_3 c + \beta_4 \cos + \beta_e \quad (6)$$

Where the $\beta$ values are the coefficients derived from the regression analysis, $b^*$ is the threshold margin that makes the merchant ROI greater than or equal to a threshold value (e.g., at least 0), p is the unit price of the promotion, d is the discount offered by the promotion, c is the merchant category, and cog is the percentage of the promotion price of the cost of goods/services provided in exchange for the promotion.

As described above with respect to the promotion size, certain factors of the promotion may be fixed (e.g., merchant category, promotion service category, research ranking, etc.), such that the regression analysis can abstract these factors out as a single constant. As a result one example equation for the threshold margin may be:

$$b^* = \beta_1 p + \beta_2 d + \beta_0 \quad (7)$$

Where $\beta_0$ is the constant derived for the fixed values.

The demand model 402 and the margin model 406, along with any other promotion parameter models derived by the promotion performance model generation module 210 may be provided to the revenue equation generation module 212. The revenue equation generation module 212 may determine a set of possible promotion parameters (e.g., a minimum and maximum value for each parameter defining a range of feasible values between the minimum and maximum) based on the historical promotion performance data (e.g., input values within a certain number of standard deviations of the means of given combinations of promotion parameters), and apply the possible parameters to the demand model 402 and the margin model 406 to maximize the revenue equation. For example, the revenue equation may take the form of:

$$\max_{p,d,b} \text{Revenue} = (1-b) * p^{1+\alpha_1} * d^{\alpha_2} * e^{\alpha_0} \quad (8)$$

$$\text{Such that: } b \geq \beta_1 p + \beta_2 d + \beta_0 \quad (9)$$

$$p \in [p_{min}, p_{max}] \quad (10)$$

$$b \in [b_{min}, b_{max}] \quad (11)$$

$$d \in [d_{min}, d_{max}] \quad (12)$$

$$q = p^{\alpha_1} * d^{\alpha_2} * e^{\alpha_0} \in [q_{min}, q_{max}] \quad (13)$$

The regression analysis of equation 13 may be the result of a log transformation of the variables. The variable e may indicate the use of an exponential function in the regression analysis.

The revenue equation 406 derived by the revenue equation generation module 212 may be employed by a promotion pricing module 214 to facilitate determination of pricing parameters for promotions. For example, the merchant may specify a particular set of promotion values 408 (e.g., a discount value, a number of promotions to offer, and a cost of the goods or services to be provided in exchange for the promotion), and the promotion pricing module 214 may utilize the revenue equation 406 to determine a margin for the promotion and marketing service that provides the merchant with a minimum ROI (e.g., at least 0%, at least 2%, at least 5%, or the like), while also ensuring a minimum amount of revenue is generated from the promotion by the promotion and marketing service. In some embodiments, the promotion pricing module 214 may provide a set of suggested pricing parameters to the merchant for verification or acceptance.

Promotional System Operations

Turning now to FIG. 5, example operations for determining promotion pricing parameters are illustrated from the perspective of a promotion and marketing service. The operations illustrated in FIG. 5 may, for example, be performed by the promotional system 102 (e.g., promotional server 104), with the assistance of, and/or under the control of one or more devices, such as apparatus 200, and may use processor 202, memory 204, input/output module 206, and communications module 208.

In operation 502, the apparatus 200 includes means, such as input/output module 206, communications module 208, or the like, for determining a demand model (e.g., the demand model 402) based on historical promotion performance data. This performance data may be retrieved or received from a historical promotion performance database 110 as described with respect to FIG. 1. As described above with respect to FIG. 4, the demand model may be generated by a regression analysis of the historical promotion performance data. This regression analysis may provide a model for predicting a promotion size based on various promotion parameters.

In operation 504, the apparatus 200 includes means, such as processor 202 or the like, for determining a margin model (e.g., the margin model 404) based on historical promotion performance data. The margin model may provide a model for predicting a margin that results in at least a threshold merchant ROI based on various promotion parameters.

In operation 506, the apparatus 200 includes means, such as processor 202 or the like, for determining a range of feasible promotion parameters based on historical promotion performance data. In order to limit the results of the regression analysis to values that are likely to reflect real-world scenarios, constraints may be imposed on the pricing parameters used to generate a revenue equation (e.g., the revenue equation 406). These constraints may be derived from the historical promotion performance data. For example, the mean and standard deviation of each promotion parameter or combination of promotion parameters may be taken, and defining a range around the mean by a certain number of standard deviations (e.g., a minimum and maximum for each promotion parameter within 2 standard deviations of the mean of the parameter). The neighborhood search may be performed based on the constraints described in equations 10-12, above. These constraints may relate to historical promotion promotions that are the same or similar to input values related to the promotion for which the promotion pricing parameters are being derived (e.g., a same or similar merchant type, deal value, deal unit value, or the like).

In operation 508, the apparatus 200 includes means, such as processor 202 or the like, for generating a revenue equation (e.g., the revenue equation 406) using the demand model, the margin model, and the range of feasible values. As described above with respect to FIG. 4, the revenue equation may use the various predictive models to determine an expected revenue based on a set of parameters for a particular promotion. These parameters may be based on the range of the feasible values for the parameters derived at operation 506.

In operation 510, the apparatus 200 includes means, such as processor 202 or the like, for receiving a set of promotion values (e.g., the merchant promotion values 408) from a merchant. The promotion values may represent parameters for a promotion desired by a merchant, such as an initial set of promotion pricing parameters to be used as a starting point for generating an updated or optimized set of pricing parameters.

In operation 512, the apparatus 200 includes means, such as processor 202 or the like, for applying the merchant promotion values to the revenue equation. As described with respect to FIG. 4, the merchant promotion values may be used as an initial input set to define a search "neighborhood" of values used to maximize the revenue equation derived at action 508.

In operation 514, the apparatus 200 includes means, such as processor 202 or the like, for selecting promotion pricing parameters based on the merchant promotion values as applied to the revenue model. For example, the promotion values provided by the merchant may be modified or otherwise altered to maximize the revenue equation, or additional parameters not provided by the merchant may be derived based on the merchant values. For example, if the merchant specifies a certain promotion unit price and discount value, these values may be used to identify a margin for the promotion and marketing service that maximizes revenue based on the promotion size (e.g., by selecting a promotion margin low enough to make the promotion inexpensive enough to be attractive to consumers and to provide a positive ROI to the merchant) and the margin per promotion (e.g., by selecting a promotion margin high enough to provide a reasonable revenue stream to the promotion and marketing service).

In optional operation 516, a promotion may be generated using the selected promotion pricing parameters. For example, the promotion may automatically be initiated and offered to consumers with the selected pricing parameters. In some embodiments, the pricing parameters may be presented to a user, such as the merchant or a sales representative, for approval prior to generation of the promotion. In yet further embodiments, multiple sets of pricing parameters (e.g., a first set that optimizes for bringing in new customers, a second set that optimizes for maximizing overspending beyond the promotion's promotional value, and a third set that optimizes merchant profit based solely on promotion redemption value) may be derived and presented to the merchant for selection. In some embodiments, the merchant may be presented with an additional opportunity to alter the promotion pricing parameters. In some embodiments, altering one or more of the promotion pricing parameters may result in a recalculation of the pricing parameters. For example, a promotion and marking system margin may be recalculated to optimize revenue in response to a merchant altering one of the pricing parameters.

Turning now to FIG. 6, example operations are shown for generating a demand model, such as the demand model 402 described with respect to FIG. 4. As described above, the demand model may include a regression analysis based on historical promotion performance data to identify correlations between particular promotion parameters and a number of promotions sold (e.g., the promotion size). As with the FIG. 5, the operations illustrated in FIG. 6 may, for example, be performed by the promotional system 102 (e.g., promotional server 104), with the assistance of, and/or under the control of one or more devices, such as apparatus 200, and may use processor 202, memory 204, input/output module 206, and communications module 208.

In operation 602, the apparatus 200 includes means, such as processor 202 for receiving historical promotion performance data. As described above, this historical promotion performance data may be accessed via a historical promotion performance database. In some embodiments, information about a particular merchant or promotion may also be received. For example, a particular regression analysis may be performed for a certain merchant or merchant category such that only data for that merchant or merchant category is included in the analysis.

In operation 604, the apparatus 200 includes means, such as processor 202 for deriving a demand model based on the historical performance data. For example, a regression analysis may be performed on the historical performance data to generate a demand model as described above with respect to FIG. 4.

Turning now to FIG. 7, example operations are shown for generating a margin model, such as the margin model 404 described with respect to FIG. 4. As described above and similarly to the demand model, the margin model may include a regression analysis based on historical promotion performance data to identify correlations between particular promotion parameters and a maximum margin charged by the promotion and marketing system that results in a threshold merchant ROI for the promotion. As with the FIGS. 5 and 6, the operations illustrated in FIG. 6 may, for example, be performed by the promotional system 102 (e.g., promotional server 104), with the assistance of, and/or under the control of one or more devices, such as apparatus 200, and may use processor 202, memory 204, input/output module 206, and communications module 208.

In operation 702, the apparatus 200 includes means, such as processor 202 for receiving historical promotion performance data. As described above, this historical promotion performance data may be accessed via a historical promotion performance database. In some embodiments, information about a particular merchant or promotion may also be received. For example, a particular regression analysis may be performed for a certain merchant or merchant category such that only data for that merchant or merchant category is included in the analysis.

In operation 704, the apparatus 200 includes means, such as processor 202 for deriving a margin model based on the historical performance data. For example, a regression analysis may be performed on the historical performance data to generate a margin model as described above with respect to FIG. 4.

In operation 706, the apparatus 200 includes means, such as processor 202 for comparing the margin model with a ROI model. As check against outliers produced by the margin model, a threshold margin (e.g., the margin that results in at least a minimum threshold merchant ROI) may be compared to a model distribution for the merchant ROI. The model distribution may be derived from observations of elements that factor into merchant ROI, such as an average consumer overspending amount (e.g., spending in excess of the promotional value), the average return customer rate, and a fraction of new customers. At operation 708, the continued processing depends upon whether the margin predicted by the margin model is outside a certain bound defined by the ROI model (e.g., 2 standard deviations), then the mean of the ROI distribution may be used instead. At operation 710, the apparatus 200 includes means, such as processor 202 for using the result value of the ROI model if the value predicted by the margin model is outside the certain bound (e.g., more than 2 standard deviations). Otherwise, at operation 710 the apparatus 200 includes means for using the result value of the margin model. Example embodiments of methods, systems, apparatuses, and computer readable media for generating a merchant ROI model for are described further with respect to Provisional U.S. Patent Application 61/770,174 filed Feb. 27, 2013, and U.S. patent application Ser. No. 13/832,804, filed Mar. 15, 2013, which are hereby incorporated by reference in their entirety.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for providing, via a merchant interface, one or more dynamically updated parameters for a promotion and performing continued analysis of promotion performance data for promotions with established pricing parameters, resulting in a positive feedback loop by which predictive models are continually refined and improved, the method comprising:

retrieving historical promotion performance data from a historical promotion performance database, wherein the historical promotion performance data comprises, for one or more past promotions, one or more of a type of past promotion, a merchant category, a discount level, an accepted value of the past promotion, a date range associated with the past promotion, a number of impressions received for the past promotion, a number of past promotions offered, a redemption rate of the past promotion, and a refund rate of the past promotion;

generating a demand model to predict an expected demand of the promotion, wherein the demand model is based on a demand regression analysis;

training the demand model using the historical promotion performance data as a demand training set, such that training includes predictively analyzing an impact of various promotion parameters on a promotion size of past promotion offerings;

generating a margin model to determine a margin for a promotion and marketing service for each sale of the promotion, wherein the margin model is based on a margin regression analysis, the margin being a portion of an accepted value received by the promotion and marketing service, that ensures both (i) at least a minimum return-on-investment (ROI) for a merchant, such that when the promotion is redeemed by a consumer towards the purchase of particular goods, services or experiences offered by the merchant, the merchant receives the minimum ROI from the promotion and marketing service to account for at least a portion of a price of the particular goods, services or experiences provided to the consumer, while concurrently (ii) establishing that a minimum amount of revenue, in total, is generated by each sale of the promotion;

training the margin model, using the historical promotion performance data as a margin training set, such that training includes predictively analyzing the impact of various promotion parameters on merchant ROIs of past promotions, and predicting a maximum margin available to the promotion and marketing service to ensure the minimum ROI, wherein each of the demand model and the margin model is configured to assist with one or more of a selection of promotion parameters, a determination of promotion parameters, or a generation of the promotion with determined promotion parameters;

wherein each of the demand model and the margin model is the result of machine learning algorithms that use the historical promotion performance data as a training set;

generating a revenue equation using the demand model, the margin model, and a set of potential promotion parameters, wherein the revenue equation provides an estimate of a revenue received by the promotion and marketing service based on the demand model and the margin model, wherein generation of the revenue equation comprises determining the set of potential promotion parameters, including at least a minimum value and maximum value for each promotion parameter, based on the historical promotion performance data, wherein the minimum value and maximum value for each promotion parameter are within a predefined number of standard deviations of the means of the promotion parameter or a combination of promotion parameters;

determining, using a processor, an estimated revenue derived by the promotion and marketing service from predicted sales of the promotion using the revenue equation based on one or more input sets of promotion pricing parameters provided as input to the revenue equation;

dynamically selecting at least one of the input sets of promotion pricing parameters for the promotion based on the estimated revenue, wherein the selected at least one of the input sets of promotion pricing parameters comprises a selected promotion margin received by the promotion and marketing service for sales of the promotion;

determining a promotion cost based on the selected promotion margin;

providing the selected at least one of the input sets of promotion pricing parameters to the merchant via a merchant interface for approval, the selected at least one of the input sets of promotion pricing parameters including the determined promotion cost;

receiving an indication of a merchant selection of one or more of the selected at least one of the input sets, the indication corresponding to an approval of the selected at least one of the input sets of promotion pricing parameters;

generating the promotion using the selected at least one of the input sets of promotion pricing parameters in response to receiving the indication;

monitoring one or more performance characteristics of the promotion;

adding the one or more performance characteristics of the promotion to the historical promotion performance data; and updating at least one of the demand model and the margin model based on the one or more performance characteristics of the promotion.

2. The method of claim 1, wherein the demand regression analysis is employed to ascertain correlations between particular parameters and promotion size.

3. The method of claim 1, wherein the one or more performance characteristics comprise at least one of a promotion redemption rate, a promotion size, or a promotion refund rate.

4. A computer program product for providing, via a merchant interface, one or more dynamically updated parameters for a promotion and performing continued analysis of promotion performance data for promotions with established pricing parameters, resulting in a positive feedback loop by which predictive models are continually refined and improved, the computer program product comprising at least one non-transitory computer-readable storage medium having computer-executable program code instructions stored therein, the computer-executable program code instructions comprising program code instructions for:

retrieving historical promotion performance data from a historical promotion performance database, wherein the historical promotion performance data comprises, for one or more past promotions, one or more of a type of past promotion, a merchant category, a discount level, an accepted value of the past promotion, a date range associated with the past promotion, a number of impressions received for the past promotion, a number of past promotions offered, a redemption rate of the past promotion, and a refund rate of the past promotion;

generating a demand model to predict an expected demand of the promotion, wherein the demand model is based on a demand regression analysis;

training the demand model using the historical promotion performance data as a demand training set, such that training includes predictively analyzing an impact of various promotion parameters on a promotion size of past promotion offerings;

generating a margin model to determine a margin for a promotion and marketing service for each sale of the promotion, wherein the margin model is based on a margin regression analysis, the margin being a portion of an accepted value received by the promotion and marketing service, that ensures both (i) at least a minimum return-on-investment (ROI) for a merchant, such that when the promotion is redeemed by a consumer towards the purchase of particular goods, services or experiences offered by the merchant, the merchant receives the minimum ROI from the promotion and marketing service to account for at least a portion of a price of the particular goods, services or experiences provided to the consumer, while concurrently (ii) establishing that a minimum amount of revenue, in total, is generated by each sale of the promotion, training the margin model using the historical promotion performance data as a margin training set, such that training includes predictively analyzing the impact of various promotion parameters on merchant ROIs of past promotions with, and predicting a maximum margin available to the promotion and marketing service to ensure the minimum ROI, wherein each of the demand model and the margin model is configured to assist with one or more of a selection of promotion parameters, a determination of promotion parameters, or a generation of the promotion with determined promotion parameters;

wherein each of the demand model and the margin model is the result of machine learning algorithms that use the historical promotion performance data as a training set;

generating a revenue equation using the demand model, the margin model, and a set of potential promotion parameters, wherein the revenue equation provides an estimate of a revenue received by the promotion and marketing service based on the demand model and the margin model, wherein generation of the revenue equation comprises determining the set of potential promotion parameters, including at least a minimum value and maximum value for each promotion parameter based on the historical promotion performance data, wherein the minimum value and maximum value for each promotion parameter are within a predefined number of standard deviations of the means of the promotion parameter or a combination of promotion parameters;

determining, using a processor, an estimated revenue derived by the promotion and marketing service from predicted sales of the promotion using the revenue equation based on one or more input sets of promotion pricing parameters provided as input to the revenue equation;

dynamically selecting at least one of the input sets of promotion pricing parameters for the promotion based on the estimated revenue, wherein the selected at least one of the input sets of promotion pricing parameters comprises a selected promotion margin received by the promotion and marketing service for sales of the promotion;

determining a promotion cost based on the selected promotion margin;

providing the selected at least one of the input sets of promotion pricing parameters to the merchant via a merchant interface for approval, the selected at least one of the input sets of promotion pricing parameters including the determined promotion cost;

receiving an indication of a merchant selection of one or more of the selected at least one of the input sets, the indication corresponding to an approval of the selected at least one of the input sets of promotion pricing parameters;

generating the promotion using the selected at least one of the input sets of promotion pricing parameters in response to receiving the indication;

monitoring one or more performance characteristics of the promotion;

adding the one or more performance characteristics of the promotion to the historical promotion performance data; and updating at least one of the demand model and the margin model based on the one or more performance characteristics of the promotion.

5. The computer program product of claim 4, wherein the demand regression analysis is employed to ascertain correlations between particular parameters and promotion size.

6. The computer program product of claim 5, wherein the one or more performance characteristics comprise at least one of a promotion redemption rate, a promotion size, or a promotion refund rate.

7. An apparatus for providing, via a merchant interface, one or more dynamically updated parameters for a promotion and performing continued analysis of promotion performance data for promotions with established pricing parameters, resulting in a positive feedback loop by which predictive models are continually refined and improved, the apparatus comprising at least one processor and at least one memory including computer program code, the at least one memory and the computer program code configured to, with the at least one processor, cause the apparatus to at least:

retrieve historical promotion performance data from a historical promotion performance database, wherein the historical promotion performance data comprises, for one or more past promotions, one or more of a type of past promotion, a merchant category, a discount level, an accepted value of the past promotion, a date range associated with the past promotion, a number of impressions received for the past promotion, a number of past promotions offered, a redemption rate of the past promotion, and a refund rate of the past promotion;

generate a demand model to predict an expected demand of the promotion, wherein the demand model is based on a demand regression analysis;

train the demand model using the historical promotion performance data as a demand training set, such that training includes predictively analyzing an impact of various promotion parameters on a promotion size of past promotion offerings;

generate a margin model to determine a margin for a promotion and marketing service for each sale of the promotion, wherein the margin model is based on a margin regression analysis, the margin being a portion of an accepted value received by the promotion and marketing service, that ensures both (i) at least a minimum return-on-investment (ROI) for a merchant, such that when the promotion is redeemed by a consumer towards the purchase of particular goods, services or experiences offered by the merchant, the merchant receives the minimum ROI from the promotion and marketing service to account for at least a portion of a price of the particular goods, services or experiences provided to the consumer, while concurrently (ii) establishing that a minimum amount of revenue, in total, is generated by each sale of the promotion;

train the margin model, using the historical promotion performance data as a margin training set, such that training includes predictively analyzing the impact of various promotion parameters on merchant ROIs of past promotions, and predicting a maximum margin available to the promotion and marketing service to ensure the minimum ROI, wherein each of the demand model and the margin model is configured to assist with one or more of a selection of promotion parameters, a determination of promotion parameters, or a generation of the promotions with determined promotion parameters;

wherein each of the demand model and the margin model is the result of machine learning algorithms that use the historical promotion performance data as a training set;

generate a revenue equation using the demand model, the margin model, and a set of potential promotion parameters, wherein the revenue equation provides an estimate of a revenue received by the promotion and marketing service based on the demand model and the margin model, wherein generation of the revenue equation comprises determining the set of potential promotion parameters, including at least a minimum value and maximum value for each promotion parameter, based on the historical promotion performance data, wherein the minimum value and maximum value for each promotion parameter are within a predefined number of standard deviations of the means of the promotion parameter or a combination of promotion parameters;

determine, using a processor, an estimated revenue derived by the promotion and marketing service from predicted sales of the promotion using the revenue equation based on one or more input sets of promotion pricing parameters provided as input to the revenue equation;

dynamically select at least one of the input sets of promotion pricing parameters for the promotion based on the estimated revenue, wherein the selected at least one of the input sets of promotion pricing parameters comprises a selected promotion margin received by the promotion and marketing service for sales of the promotion;

determine a promotion cost based on the selected promotion margin; and provide the selected at least one of the input sets of promotion pricing parameters to the merchant via a merchant interface for approval, the selected at least one of the input sets of promotion pricing parameters including the determined promotion cost;

receive an indication of a merchant selection of one or more of the selected at least one of the input sets, the indication corresponding to an approval of the selected at least one of the input sets of promotion pricing parameters;

generate the promotion using the selected at least one of the input sets of promotion pricing parameters in response to receiving the indication;

monitor one or more performance characteristics of the promotion;

add the one or more performance characteristics of the promotion to the historical promotion performance data; and update at least one of the demand model and the margin model based on the one or more performance characteristics of the promotion.

8. The apparatus of claim 7, wherein the demand regression analysis is employed to ascertain correlations between particular parameters and promotion size.

9. The apparatus of claim 7, wherein the one or more performance characteristics comprise at least one of a promotion redemption rate, a promotion size, or a promotion refund rate.

* * * * *